United States Patent
Kurino et al.

(10) Patent No.: US 9,388,512 B2
(45) Date of Patent: Jul. 12, 2016

(54) PARA-TYPE WHOLLY AROMATIC COPOLYAMIDE DRAWN FIBER AND METHOD FOR PRODUCING THE SAME

(71) Applicant: TEIJIN LIMITED, Osaka-shi, Osaka (JP)

(72) Inventors: Toru Kurino, Osaka (JP); Naoya Komiya, Ehime (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 14/402,598

(22) PCT Filed: Jun. 6, 2013

(86) PCT No.: PCT/JP2013/065699
§ 371 (c)(1),
(2) Date: Nov. 20, 2014

(87) PCT Pub. No.: WO2013/187306
PCT Pub. Date: Dec. 19, 2013

(65) Prior Publication Data
US 2015/0087800 A1    Mar. 26, 2015

(30) Foreign Application Priority Data

Jun. 12, 2012  (JP) ................................ 2012-132935
May 31, 2013  (JP) ................................ 2013-115918

(51) Int. Cl.
| | | |
|---|---|---|
| C08G 69/32 | (2006.01) |
| D01F 6/80 | (2006.01) |
| C08G 69/26 | (2006.01) |
| C08G 69/40 | (2006.01) |
| D02J 1/22 | (2006.01) |
| D01D 5/06 | (2006.01) |
| D01D 5/12 | (2006.01) |

(52) U.S. Cl.
CPC .............. *D01F 6/805* (2013.01); *C08G 69/265* (2013.01); *C08G 69/32* (2013.01); *C08G 69/40* (2013.01); *D02J 1/224* (2013.01); *D01D 5/06* (2013.01); *D01D 5/12* (2013.01); *D10B 2401/063* (2013.01)

(58) Field of Classification Search
CPC .................... D07B 2205/20; H05K 2201/029; F41H 5/0471; Y10T 428/2969; C08G 69/32; D01F 6/805
See application file for complete search history.

(56) References Cited

FOREIGN PATENT DOCUMENTS

| | | |
|---|---|---|
| CN | 1473969 A | 2/2004 |
| CN | 101921395 A | 12/2010 |
| JP | 07-166417 A | 6/1995 |
| JP | 08-296116 A | 11/1996 |
| JP | 08-311715 A | 11/1996 |
| JP | 2009-040804 A | 2/2009 |
| JP | 2010-095832 * | 4/2010 |
| JP | 2010-227839 A | 10/2010 |
| JP | 2011-202292 A | 10/2011 |
| JP | 2012-012725 * | 1/2012 |
| JP | 2012-012725 A | 1/2012 |

OTHER PUBLICATIONS

Glasscock et al "High Performance Polyamides Fulfill Demanding Requirements for Automotive Thermal Management Components", DuPont Engineering Polymers, Dupont, Dec. 2008.*
International Search Report of PCT/JP2013/065699 dated Aug. 20, 2013 [PCT/ISA/210].
Communication dated Aug. 31, 2015 from the State Intellectual Property Office, P.R. China issued in corresponding Chinese application No. 201380030918.4.

* cited by examiner

*Primary Examiner* — Gregory Listvoyb
(74) *Attorney, Agent, or Firm* — Sughrue Mion, PLLC

(57) ABSTRACT

Provided is a para-type wholly aromatic copolyamide drawn fiber having a tensile elastic modulus of 630 cN/dtex or more. The fiber is obtained by subjecting a para-type wholly aromatic copolyamide raw material fiber to high-tension hot drawing under a tension and at a temperature within specific ranges.

10 Claims, No Drawings

PARA-TYPE WHOLLY AROMATIC COPOLYAMIDE DRAWN FIBER AND METHOD FOR PRODUCING THE SAME

CROSS REFERENCE TO RELATED APPLICATIONS

This application is a National Stage of International Application No. PCT/JP2013/065699, filed Jun. 6, 2013 (claiming priority based on Japanese Patent Application Nos. 2012-132935, filed Jun. 12, 2012, and 2013-115918, filed May 31, 2013), the contents of which are incorporated herein by reference in their entirety.

TECHNICAL FIELD

The present invention relates to a para-type wholly aromatic copolyamide fiber, and also to a method for producing the same. More specifically, it relates to a para-type wholly aromatic copolyamide fiber having a high tensile elastic modulus, and also to a method for producing the same.

BACKGROUND ART

Para-type wholly aromatic copolyamide fibers made of an aromatic dicarboxylic acid component and an aromatic diamine component as main components are characterized by high strength, high tensile elastic modulus, low creep, high heat resistance, high chemical resistance, etc., and thus have been conventionally used for various industrial material applications, including reinforcing material applications for resin, rubber, and the like, ropes, etc. These industrial materials also have found increasing applications in severer environments such as high-temperature environments, and the physical properties and characteristics of para-type wholly aromatic copolyamide fibers are expected to be further improved.

Such a para-type wholly aromatic copolyamide fiber is generally produced by a so-called "wet spinning method" or "half-dry half-wet spinning method." That is, an optically isotropic solution for spinning is extruded through a spinneret, and, after once being passed through air or an inert gas, or directly without being passed, brought into contact with a coagulation liquid in a coagulation bath, followed by steps of washing with water, drying, drawing, etc., to give a final fiber.

Incidentally, generally, a para-type wholly aromatic copolyamide fiber is produced using an optically isotropic solution for spinning. Therefore, its high mechanical properties, such as high strength and high tensile elastic modulus, are not developed until the fiber is drawn.

However, because the molecular structure of a para-type wholly aromatic copolyamide polymer is extremely rigid, it has been necessary to, prior to drawing, plasticize the fiber to some extent at a high temperature close to the decomposition temperature of the polymer or by swelling in a solvent in which the polymer is soluble. Therefore, it has been difficult to perform drawing under high tension, and, as a result, it has been impossible to sufficiently increase the molecular orientation, leading to the problem that the tensile elastic modulus is slightly inferior as compared with a high-performance fiber produced using an optically anisotropic solution for spinning, such as a para-type wholly aromatic polyamide fiber, a typical example thereof being paraphenylene terephthalamide (hereinafter, PPTA).

Accordingly, various studies have been made to improve the tensile elastic modulus of a para-type wholly aromatic copolyamide fiber. For example, Patent Documents 1 to 3 report a method in which a para-type wholly aromatic copolyamide fiber produced by the "wet spinning method" or "half-dry half-wet spinning method" is subjected to a tensioning heat treatment under specific conditions.

However, according these methods, because the fiber is heat-treated under extremely high tension, some of the fiber-forming single yarns break. This not only significantly decreases the quality of the fiber, but also reduces the number of single yarns effective for the development of tensile elastic modulus. Accordingly, as a result, the tensile elastic modulus as a fiber bundle has not been much improved, and a sufficiently satisfactory tensile elastic modulus has not yet been achieved at present.

PRIOR ART DOCUMENTS

Patent Documents

Patent Document 1: JP-A-7-166417
Patent Document 2: JP-A-8-296116
Patent Document 3: JP-A-8-311715

SUMMARY OF THE INVENTION

Problems that the Invention is to Solve

The invention has been made against this background. An object of the invention is to provide a para-type wholly aromatic copolyamide fiber having an excellent tensile elastic modulus and a method for producing the same.

Means for Solving the Problems

The present inventors have conducted extensive research to solve the problems mentioned above. As a result, they have found that the problems can be solved by subjecting a para-type wholly aromatic copolyamide raw material fiber to high-tension hot drawing under a tension and at a temperature within specific ranges, and thus accomplished the invention.

That is, the invention is a para-type wholly aromatic copolyamide drawn fiber having a tensile elastic modulus of 630 cN/dtex or more and a dry-heat creep of $2.0 \times 10^{-4}\%$ or less after the lapse of 10 hours at 80° C.

Another aspect of the invention is a method for producing the para-type wholly aromatic copolyamide drawn fiber mentioned above, including a high-tension drawing step of subjecting a para-type wholly aromatic copolyamide raw material fiber to hot drawing. The para-type wholly aromatic copolyamide raw material fiber is obtained by wet spinning or half-dry half-wet spinning from a para-type wholly aromatic copolyamide solution. The hot drawing is performed under a tension of 1% or more and less than 20% of the breaking tension of the para-type wholly aromatic copolyamide raw material fiber and at a temperature of 50° C. or more and 450° C. or less in such a manner that the para-type wholly aromatic copolyamide raw material fiber is not rubbed against metal of a device.

Advantage of the Invention

The para-type wholly aromatic copolyamide drawn fiber of the invention serves as a fiber having an excellent tensile elastic modulus together with the inherent heat resistance of para-type wholly aromatic copolyamide fibers. At the same time, the breaking of fiber-forming single yarns is suppressed, and thus the fiber also has high tensile strength.

Further, the para-type wholly aromatic copolyamide drawn fiber of the invention serves as a fiber in which the deterioration of creep characteristics at high temperatures is suppressed, and also loss of tensile strength at high temperatures is suppressed.

Accordingly, the para-type wholly aromatic copolyamide drawn fiber of the invention is useful for various industrial material applications. In particular, the fiber is particularly useful for reinforcing material applications for resin, rubber, and the like, rope applications, woven fabric applications, etc., for use at high temperatures.

MODE FOR CARRYING OUT THE INVENTION

Hereinafter, embodiments of the invention will be described in detail.

<Para-Type Wholly Aromatic Copolyamide>

The para-type wholly aromatic copolyamide of the invention is a polymer having one kind or two or more kinds of divalent aromatic groups directly linked by an amide bond in the para position. As aromatic groups, two aromatic rings may be linked via oxygen, sulfur, or an alkylene group, or two or more aromatic rings may be directly linked. Further, the divalent aromatic group may include a lower alkyl group such as a methyl group or an ethyl group, a methoxy group, a halogen group such as a chlorine group, or the like.

<Production Method for Para-Type Wholly Aromatic Copolyamide>

The para-type wholly aromatic copolyamide of the invention can be produced in accordance with a conventionally known method. For example, a polymer solution of a para-type wholly aromatic copolyamide can be obtained by allowing an aromatic dicarboxylic acid chloride component to react with an aromatic diamine component in an amide polar solvent.

[Raw Materials for Para-Type Wholly Aromatic Polyamide]

(Aromatic Dicarboxylic Acid Dichloride Component)

The aromatic dicarboxylic acid dichloride component to serve as a raw material for the para-type wholly aromatic copolyamide used in the invention is not particularly limited, and generally known ones may be used. Examples thereof include terephthalic acid dichloride, 2-chloroterephthalic acid dichloride, 3-methylterephthalic acid dichloride, 4,4'-biphenyldicarboxylic acid dichloride, and 2,6-naphthalene-dicarboxylic acid dichloride. Among them, in terms of general versatility, the mechanical properties of the fiber, etc., it is most preferable to use terephthalic acid dichloride.

One kind or two or more kinds of these aromatic dicarboxylic acid dichlorides may be used, and their proportions are not particularly limited. Incidentally, in the invention, a small amount of component forming a bond in a position other than para, such as isophthalic acid dichloride, may also be contained.

(Aromatic Diamine Component)

With respect to the aromatic diamine component to serve as a raw material for the para-type wholly aromatic copolyamide used in the invention, examples thereof include, but are not limited to, paraphenylene diamine, 3,4'-diaminodiphenyl ether, parabiphenylene diamine, 5-amino-2-(4-aminophenylene)benzimidazole, and 1,4-dichloroparaphenylene diamine. The aromatic ring can have a substituent or contain other heterocyclic rings, etc.

As the aromatic diamine component, one kind or two or more kinds of these may be used, and their proportions are not particularly limited. Incidentally, in the invention, a small amount of component forming a bond in a position other than para, such as metaphenylene diamine, may also be contained.

As a raw material for the para-type wholly aromatic copolyamide used in the invention, two or more kinds of these may be used, and the combination is not particularly limited. However, in terms of general versatility, the mechanical properties of the fiber, etc., it is most preferable to use the following two kinds: paraphenylene diamine and 3,4'-diaminodiphenyl ether.

In the case of using a combination of paraphenylene diamine and 3,4'-diaminodiphenyl ether, their proportions are not particularly limited, but it is preferable that the proportions are 30 to 70 mol % and 70 to 30 mol %, respectively, relative to the total amount of aromatic diamines. They are still more preferably 40 to 60 mol % and 60 to 40 mol %, respectively, and most preferably 45 to 55 mol % and 55 to 45 mol %, respectively.

(Raw Material Ratio)

With respect to the ratio between the aromatic dicarboxylic acid chloride component and the aromatic diamine component to serve as raw materials for the para-type wholly aromatic copolyamide, the molar ratio of the aromatic dicarboxylic acid chloride component to the aromatic diamine component is preferably within a range of 0.90 to 1.10, and more preferably within a range of 0.95 to 1.05. In the case where the molar ratio of the aromatic dicarboxylic acid chloride component is less than 0.90 or more than 1.10, the reaction with the aromatic diamine component does not sufficiently proceed, and a high degree of polymerization is not obtained; therefore, this is undesirable.

[Polymerization of Para-Type Wholly Aromatic Copolyamide]

(Polymerization Conditions)

The conditions for the polymerization of the aromatic dicarboxylic acid chloride component and the aromatic diamine component are not particularly limited. A reaction between an acid chloride and a diamine is generally rapid, and the polymerization temperature is preferably within a range of $-25°$ C. to $100°$ C., for example, and still more preferably within a range of $-10°$ C. to $80°$ C.

(Polymerization Solvent)

Examples of amide solvents used for the production of the para-type wholly aromatic copolyamide include N-methyl-2-pyrrolidone (hereinafter sometimes referred to as NMP), N,N-dimethylformamide, N,N-dimethylacetamide, and dimethylimidazolidinone. These solvents may be used alone, or it is also possible to use two or more kinds as a mixed solvent. Incidentally, it is preferable that the used solvent has been dehydrated.

In the production of the para-type wholly aromatic copolyamide used in the invention, in terms of general versatility, harmfulness, handleability, solubility in the para-type wholly aromatic copolyamide polymer, etc., it is most preferable to use N-methyl-2-pyrrolidone (NMP).

(Neutralization Reaction)

It is preferable that after the completion of polymerization, a basic inorganic compound such as sodium hydroxide, potassium hydroxide, calcium hydroxide, or calcium oxide is added as necessary to effect a neutralization reaction.

(Post-Treatment after Polymerization, Etc.)

The para-type wholly aromatic copolyamide resulting from polymerization may be injected into a non-solvent such as alcohol or water to cause precipitation, and removed in the form of pulp. The removed para-type wholly aromatic polyamide may be redissolved in another solvent and then used for fiber formation, but it is also possible that the polymer solution resulting from the polymerization reaction is directly prepared into a solution for spinning (polymer dope) and used. The solvent used for redissolution after removal is not particularly limited as long as it dissolves the para-type wholly aromatic polyamide. However, the solvents used for polymerization mentioned above are preferable.

<Production of Para-Type Wholly Aromatic Copolyamide Raw Material Fiber>

The para-type wholly aromatic copolyamide raw material fiber used in the invention is a fiber obtained by wet spinning or half-dry half-wet spinning. That is, a para-type wholly aromatic copolyamide solution (solution for spinning: polymer dope) containing a para-type wholly aromatic copolyamide and a solvent is discharged from a spinneret to form a yarn, followed by steps of washing with water, drying, hot drawing, etc., and the fiber is finally obtained.

An example of a method for producing the para-type wholly aromatic copolyamide raw material fiber used in the invention will be described hereinafter.

[Step of preparing Para-Type Wholly Aromatic Copolyamide Solution (Solution for Spinning: Polymer Dope)]

In the production of the para-type wholly aromatic copolyamide raw material fiber used in the invention, first, a para-type wholly aromatic copolyamide solution for forming a fiber (solution for spinning: polymer dope) is prepared. The para-type wholly aromatic copolyamide solution (solution for spinning: polymer dope) contains a para-type wholly aromatic copolyamide and a solvent, and the method for preparation is not particularly limited.

As the solvent used for the preparation of the para-type wholly aromatic copolyamide solution (solution for spinning: polymer dope), the solvents used for the polymerization of the para-type wholly aromatic copolyamide mentioned above are preferable. Incidentally, the solvents may be used alone, or it is also possible to use two or more kinds of solvents mixed as a mixed solvent. The polymer solution obtained in the production of the para-type wholly aromatic copolyamide may also be used directly without isolating the polymer therefrom.

Further, for the purpose of enhancing the solubility of the para-type wholly aromatic copolyamide in the solvent, a mineral salt may be used as a dissolution aid. Examples of mineral salts include calcium chloride and lithium chloride. The amount of mineral salt to be added relative to the polymer dope is not particularly limited. However, in terms of the improving effect on polymer solubility, the solubility of the mineral salt in the solvent, etc., it is preferable that the amount is 1 to 10% by mass relative to the mass of the polymer dope.

In addition, for the purpose of imparting functionality and the like to the fiber, other optional components such as additives may also be incorporated within the gist of the invention. In the case where additives and the like are incorporated, they can be introduced during the preparation of a polymer dope. The method for introduction is not particularly limited. For example, they can be introduced into the polymer dope using an extruder, a mixer, or the like.

Incidentally, it is preferable that the polymer concentration in the para-type wholly aromatic copolyamide solution (solution for spinning: polymer dope), that is, the concentration of the para-type wholly aromatic copolyamide, is within a range of 0.5% by mass or more and 30% by mass or less. In the case where the polymer concentration in the para-type wholly aromatic copolyamide solution (solution for spinning: dope) is less than 0.5% by mass, there is not much polymer entanglement, and thus the viscosity necessary for spinning cannot be obtained, leading to a significant decrease in the discharge stability during spinning. Meanwhile, in the case where the polymer concentration is more than 30% by mass, the viscosity of the dope rapidly increases, leading to a decrease in the discharge stability during spinning, and, due to the rapid pressure increase in the spinning pack, it is likely to be difficult to achieve stable spinning.

[Spinning/Coagulation Step]

In the spinning/coagulation step, a fiber is formed by a wet spinning method or a half-dry half-wet spinning method. For example, according to a half-dry half-wet method, the para-type wholly aromatic copolyamide solution (solution for spinning: polymer dope) is fed into a spinning pack equipped with a spinneret, and the polymer dope is discharged from the spinneret, introduced into a coagulation bath containing a poor solvent through a gas phase (air gap) of a certain range, and coagulated in the coagulation liquid to give an undrawn yarn. The system for feeding the para-type wholly aromatic copolyamide solution (solution for spinning: polymer dope) and the spinneret-equipped spinning pack used at this time are not particularly limited as long as they allow for uniform feeding and discharge.

With respect to the spinneret to be used, in order for the number of filaments in the resulting fiber to be 5 to 2000, it is preferable that the number of holes is 5 to 2000. In addition, the hole diameter, nozzle length, material, and the like are not particularly limited as long as the single-yarn fineness of the resulting fiber can be a desired value (e.g., within a range of 0.8 to 6.0 dtex), and they can be suitably adjusted in consideration of spinnability, etc.

The temperature of the polymer dope passing through the spinneret and the temperature of the spinneret are not particularly limited. However, in terms of spinnability and the discharge pressure on the polymer dope, a temperature of 80 to 120° C. is preferable.

In the coagulation of the polymer dope discharged from the spinneret in the coagulation liquid, in the case where the temperature is greatly different between the spinneret and the coagulation liquid, contact between the spinneret and the coagulation liquid leads to changes in their temperatures, making it difficult to control the spinning step. Thus, in the case where the temperature is greatly different between the spinneret and the coagulation liquid, it is preferable to perform half-dry half-wet spinning involving a gas phase (air gap). The length of the air gap is not particularly limited, but is preferably within a range of 5 to 20 mm in terms of temperature controllability, spinnability, etc.

Incidentally, the coagulation liquid used in the spinning/coagulation step is an aqueous NMP solution, for example, and its temperature and concentration are not particularly limited. They may be suitably prepared without causing problems with the coagulation state, the process-passing properties in the subsequent steps, and the like of the formed yarn.

[Washing with Water Step]

Next, the coagulated yarn obtained in the spinning/coagulation step is washed with water. In the step of washing with water, NMP in the yarn is diffused with water to remove it from the yarn. As long as NMP can be sufficiently removed from the yarn, the conditions for washing with water, such as the temperature and the duration of washing with water, are not particularly limited.

[Drying Step]

Next, the yarn after washing with water is subjected to a drying step. The conditions for drying are not particularly limited, and there is no problem as long as the conditions allow the moisture adhering to the fiber to be sufficiently removed. However, in consideration of workability and the thermal degradation of the fiber, a range of 150 to 250° C. is preferable. In addition, drying may be performed using a contact drying device, such as a roller, or a noncontact drying device, in which the fiber is passed through a drying furnace, for example.

[Hot Drawing Step]

Subsequently, the fiber after drying is hot-drawn. In this step, heat is applied to the fiber to densify its molecular structure, and also the fiber is drawn to promote the orientation of molecules, thereby improving the physical properties. The hot drawing temperature at this time is preferably within a range of 300 to 600° C., still more preferably 320° C. to 580° C., and most preferably within a range of 350 to 550° C. In the case where the hot drawing temperature is less than 300° C., the yarn is not sufficiently drawn; therefore, this is undesirable. Meanwhile, in the case where it is more than 600° C., the polymer is thermally decomposed, whereby the fiber is degraded, resulting in a significant decrease in the mechanical properties.

The draw ratio in the hot drawing step is preferably 5 to 15, but is not particularly limited to this range. In addition, this hot drawing step can also be performed in several stages as necessary.

[Winding Step]

After optionally performing a step of removing fine particles, the fiber is wound by a winder. At this time, immediately before winding by a winder, an oil agent can be applied to the fiber for the purpose of imparting anti-static properties, lubricity, etc. In that case, the oil agent to be applied is not particularly limited in kind, amount, etc., and a known method can be directly adopted. In addition, the method and conditions for winding by a winder are not particularly limited, and winding may be performed using a known winder under suitably adjusted conditions.

Incidentally, the hot drawing step mentioned above can be followed by the below-mentioned high-tension hot drawing step of the invention. In that case, this winding step may be performed after the high-tension hot drawing step.

<Production of Para-Type Wholly Aromatic Copolyamide Drawn Fiber>

The para-type wholly aromatic copolyamide drawn fiber of the invention is obtained by subjecting the para-type wholly aromatic copolyamide raw material fiber mentioned above to high-tension hot drawing under a tension and at a temperature within specific ranges. Incidentally, in the invention, as long as the high-tension hot drawing step is included, other steps can also be present as necessary.

Hereinafter, the high-tension hot drawing step, which is an indispensable step in the method for producing a para-type wholly aromatic copolyamide drawn fiber of the invention, will be described.

[High-Tension Hot Drawing Step]

(Tension)

It is indispensable that the tension in the high-tension hot drawing step is within a range of 1% or more and less than 20% of the breaking tension of the para-type wholly aromatic copolyamide raw material fiber. Incidentally, the "breaking tension" herein refers to the maximum tension under which the para-type wholly aromatic copolyamide raw material fiber before the high-tension hot drawing step completely breaks at room temperature.

In the case where the tension is less than 1% of the breaking tension, the tension is so low that the molecular orientation does not change at all. As a result, the tensile elastic modulus is hardly improved by high-tension hot drawing. Meanwhile, in the case where the tension is 20% or more of the breaking tension, some of the fiber-forming single yarns break. This not only decreases the quality, but also reduces the number of effective single yarns that contribute to the improvement of the tensile elastic modulus. Accordingly, as a result, the tensile elastic modulus as a fiber bundle is not much improved.

The tension in the high-tension hot drawing step is preferably within a range of 5% or more and 20% or less, most preferably within a range of 10% or more and 20% or less, of the breaking tension of the para-type wholly aromatic copolyamide raw material fiber.

As a method for achieving a tension within the above range in the high-tension hot drawing step, a method that adjusts the draw ratio in the high-tension hot drawing step can be mentioned, for example. Accordingly, the draw ratio in the high-tension hot drawing step is not particularly limited as long as the tension in the high-tension hot drawing step can be within the above range.

(Temperature)

It is indispensable that the temperature in the high-tension hot drawing step is within a range of 50° C. or more and 450° C. or less. In the case where the temperature is less than 50° C., the tension merely causes elastic deformation, and the fiber immediately turns back to the undrawn form when the tension is removed. Therefore, the tensile elastic modulus does not change at all. Meanwhile, in the case where the temperature is more than 450° C., the para-type wholly aromatic copolyamide is thermally decomposed. In addition, it turns pseudo thermoplastic, making it difficult to apply high tension during drawing. As a result, the mechanical properties are not improved.

As a method for achieving a temperature within the above range in the high-tension hot drawing step, a method that adjusts the ambient temperature in the high-tension hot drawing step or, in the case of using a heating roller, adjusts the surface temperature thereof can be mentioned, for example.

The temperature in the high-tension hot drawing step is preferably within a range of 100° C. or more and 425° C. or less, and most preferably within a range of 150° C. or more and 400° C. or less.

(Drawing System)

In the high-tension hot drawing step, it is preferable to use a system that does not allow the para-type wholly aromatic copolyamide raw material fiber to be rubbed against metal.

The "system that does not allow a fiber to be rubbed against metal" herein refers to a system in which the para-type wholly aromatic copolyamide raw material fiber does not come into contact with the metal forming the system during hot drawing, or a system equipped with a metal roller or the like that moves at the same speed as the running para-type wholly aromatic copolyamide raw material fiber. Examples thereof include, but are not limited to, non-contact heat treatment furnaces and systems equipped with a variable-speed heating roller.

In the case of using a system in which the para-type wholly aromatic copolyamide raw material fiber is rubbed against metal, such as a contact hot plate, because the fiber is rubbed against metal, single yarns easily break, resulting in a significant decrease in the strength of the para-type wholly aromatic copolyamide drawn fiber. In addition, because the fiber is rubbed against metal, the tension becomes significantly non-uniform, making it difficult to uniformly apply tension. As a result, the tensile elastic modulus cannot be much improved.

Incidentally, as long as the system does not allow the fiber to be rubbed against metal, other elements are not particularly limited. As necessary, the fiber can be opened before the heat treatment, the fiber-forming single yarns can be aligned, or a tensioner for tension adjustment or the like can be used.

(Other Conditions)

In the high-tension hot drawing step, other conditions such as speed and duration, for example, are not particularly limited, and may be suitably adjusted as necessary.

<Physical Properties of Para-Type Wholly Aromatic Copolyamide Drawn Fiber>
[Tensile Elastic Modulus]

The para-type wholly aromatic copolyamide drawn fiber obtained by the method of the invention is a fiber having a tensile elastic modulus of 630 cN/dtex or more. The tensile elastic modulus is preferably 640 cN/dtex or more, and most preferably 650 cN/dtex or more.

[Dry-Heat Creep]

It is preferable that the para-type wholly aromatic copolyamide drawn fiber obtained by the method of the invention is a fiber whose dry-heat creep measured after the lapse of 10 hours at dry heat (80° C.) is $2.0 \times 10^{-4}$% or less. The dry-heat creep measured after the lapse of 10 hours at 80° C. is preferably $1.5 \times 10^{-4}$% or less, and most preferably $1.0 \times 10^{-4}$% or less.

[Dry-Heat Tensile Strength]

The para-type wholly aromatic copolyamide drawn fiber obtained by the method of the invention is a fiber whose dry-heat tensile strength at the measurement temperature T (° C.) satisfies equation (1).

$$\text{Dry-heat tensile strength} \geq 27.0 - 0.05 \times T \quad (1)$$

Incidentally, the dry-heat tensile strength preferably satisfies equation (2), and most preferably satisfies equation (3).

$$\text{Dry-heat tensile strength} \geq 27.2 - 0.05 \times T \quad (2)$$

$$\text{Dry-heat tensile strength} \geq 27.5 - 0.05 \times T \quad (3)$$

[Tensile Strength]

It is preferable that the para-type wholly aromatic copolyamide drawn fiber obtained by the method of the invention is a fiber having a tensile strength of 25.0 cN/dtex or more. The tensile strength is preferably 25.5 cN/dtex or more.

[Number of Single Yarns]

The para-type wholly aromatic copolyamide drawn fiber obtained by the method of the invention is a fiber in which the number of single yarns is 5 to 2000 filaments. The number of single yarns is preferably 50 to 1500 filaments, and most preferably 100 to 1000 filaments.

[Single-Yarn Fineness]

The para-type wholly aromatic copolyamide drawn fiber obtained by the method of the invention has a single-yarn fineness of 0.8 to 6.0 dtex. The single-yarn fineness is preferably 1.0 to 5.0 dtex, and most preferably 1.2 to 4.0 dtex.

EXAMPLES

Hereinafter, the invention will be described in further detail through examples, etc. However, within the gist thereof, the invention is not limited to these examples.

<Measurement/Evaluation Method>

In the examples and the comparative examples, the following items were measured/evaluated by the following methods.

(1) Fineness of Para-Type Wholly Aromatic Copolyamide Raw Material Fiber 100 m of the obtained fiber bundle was wound using a known sizing reel, and its mass was measured. The product of the obtained mass multiplied by 100 was calculated as the mass per 10000 m, that is, fineness (dtex).

(2) Breaking Tension of Para-Type Wholly Aromatic Copolyamide Raw Material Fiber Using a tensile tester (manufactured by INSTRON, trade name: INSTRON, model: 5565) with chucks for yarn testing, measurement was performed under the following conditions.

[Measurement Conditions]
Temperature: room temperature
Test piece: 75 cm
Twist coefficient: 0
Test speed: 250 mm/min
Chuck-to-chuck distance: 500 mm (3) Tension in High-Tension Hot Drawing Step Using a tension meter (manufactured by SCHMIDT, trade name: MECHANICAL TENSION METER, model: DN1), tension was directly measured from a fiber passing through the high-tension hot drawing step.

(4) Tensile Strength, Breaking Elongation, and Tensile Elastic Modulus of Para-Type Wholly Aromatic Copolyamide Drawn Fiber Using a tensile tester (manufactured by INSTRON, trade name: INSTRON, model: 5565) with chucks for yarn testing, measurement was performed in accordance with the procedure of ASTM D885 under the following conditions.

[Measurement Conditions]
Temperature: room temperature
Test piece: 75 cm
Twist coefficient: 1
Test speed: 250 mm/min
Chuck-to-chuck distance: 500 mm (5) Dry-Heat Creep of Para-Type Wholly Aromatic Copolyamide Drawn Fiber Using a tensile tester (manufactured by Yasuda Seiki Seisakusho, Ltd., trade name: Thermal Stress Tester, model: No. 145A), measurement was performed under the following conditions in accordance with the procedure of JIS L1017, except that the sample was set in the tester, and then a load was applied for 10 hours prior to the measurement.

[Measurement Conditions]
Temperature: 80° C.
Test piece: 400 mm
Twist coefficient: 1
Test duration: 100 hours
Test load: breaking tenacity×20%

(6) Dry-Heat Tensile Strength of Para-Type Wholly Aromatic Copolyamide Drawn Fiber Measurement was performed using a tensile tester (manufactured by INSTRON, trade name: INSTRON equipped with a thermostat, model: 5565) with chucks for yarn testing. Measurement was performed under the following conditions in accordance with the procedure of ASTM D885, except that the sample was set in the thermostat and stabilized at the specified temperature prior to the measurement.

[Measurement Conditions]
Test piece: 75 cm
Twist coefficient: 1
Test speed: 250 mm/min
Chuck-to-chuck distance: 500 mm (7) Quality of Para-Type Wholly Aromatic Copolyamide Drawn Fiber A predetermined amount of the obtained fiber was wound by a winder, and the number of single-yarn breakages on the winding surface was visually counted and rated according the following criteria.

[Evaluation Criteria]
Good: The number of single-yarn breakages=0 to 10
Fair: The number of single-yarn breakages=11 to 20
Poor: The number of single-yarn breakages>21

Example 1

[Production of Para-Type Wholly Aromatic Copolyamide]

By a known method, 100 parts by mass of terephthalic acid dichloride was added to 27 parts by mass of paraphenylene diamine dissolved in NMP and 50 parts by mass of 3,4'-diaminodiphenyl ether to effect a polycondensation reaction, thereby giving a copolyparaphenylene/3,4'-oxydiphenylene terephthalamide solution (solution for spinning: polymer dope). The polymer concentration at this time was 6% by mass.

[Production of Para-Type Wholly Aromatic Copolyamide Raw Material Fiber]

(Spinning/Coagulation Step)

The solution for spinning (polymer dope) obtained above was heated to 105° C., fed to a spinning pack equipped with a spinneret having 1000 holes with a hole diameter of 0.3 mm and heated to 105° C., and, through a 10-mm air gap, passed through a coagulation bath filled with an aqueous solution at 50° C. having an NMP concentration of 30% by mass, thereby giving a coagulated fiber bundle with the polymer coagulated.

(Washing with Water Step/Drying Step)

Subsequently, the coagulated fiber bundle was passed through a water washing bath prepared to 55° C. and thus washed with water, and then dried on a drying roller at 200° C.

(Hot Drawing Step)

Next, after drying the fiber bundle, the first stage of hot drawing was performed at 380° C. The draw ratio at this time was 2.4. Subsequently, the second stage of hot drawing was performed at 530° C. The draw ratio at this time was 4.

The breaking tension of the obtained para-type wholly aromatic copolyamide raw material fiber was 32700 cN.

[Production of Para-Type Wholly Aromatic Copolyamide Drawn Fiber]

(High-Tension Hot Drawing Step)

Subsequently, the obtained para-type wholly aromatic copolyamide raw material fiber was subjected to high-tension hot drawing using a non-contact heat treatment furnace. At this time, the tension was 3900 cN (12% of the breaking tension of the para-type wholly aromatic copolyamide raw material fiber), the temperature was 300° C., and the draw ratio was 1.04.

Then, finally, the fiber was wound on a paper tube by a winder, thereby giving a para-type wholly aromatic copolyamide drawn fiber. The physical properties of the obtained para-type wholly aromatic copolyamide drawn fiber are shown in Table 1.

Example 2

[Production of Para-Type Wholly Aromatic Copolyamide Raw Material Fiber]

A para-type wholly aromatic copolyamide raw material fiber was produced in the same manner as in Example 1, except that the number of holes of the spinneret in the spinning/coagulation step was 133. The breaking tension of the obtained para-type wholly aromatic copolyamide raw material fiber was 4400 cN.

[Production of Para-Type Wholly Aromatic Copolyamide Drawn Fiber]

A para-type wholly aromatic copolyamide drawn fiber was obtained by the same procedure as in Example 1, except that the tension in the high-tension hot drawing step was 700 cN (16% of the breaking tension of the para-type wholly aromatic copolyamide raw material fiber). The physical properties of the obtained para-type wholly aromatic copolyamide drawn fiber are shown in Table 1.

Example 3

[Production of Para-Type Wholly Aromatic Copolyamide Raw Material Fiber]

A para-type wholly aromatic copolyamide raw material fiber was produced in the same manner as in Example 1, except that the number of holes of the spinneret in the spinning/coagulation step was 48. The breaking tension of the obtained para-type wholly aromatic copolyamide raw material fiber was 2600 cN.

[Production of Para-Type Wholly Aromatic Copolyamide Drawn Fiber]

A para-type wholly aromatic copolyamide drawn fiber was obtained by the same procedure as in Example 1, except that the tension in the high-tension hot drawing step was 350 cN (13% of the breaking tension of the para-type wholly aromatic copolyamide raw material fiber). The physical properties of the obtained para-type wholly aromatic copolyamide drawn fiber are shown in Table 1.

Comparative Example 1

A para-type wholly aromatic copolyamide drawn fiber was obtained by the same procedure as in Example 1, except that high-tension hot drawing was not performed (i.e., the para-type wholly aromatic copolyamide raw material fiber of Example 1). The physical properties of the obtained fiber are shown in Table 2.

Comparative Example 2

A para-type wholly aromatic copolyamide drawn fiber was obtained by the same procedure as in Example 2, except that high-tension hot drawing was not performed (i.e., the para-type wholly aromatic copolyamide raw material fiber of Example 2). The physical properties of the obtained fiber are shown in Table 2.

Comparative Example 3

A para-type wholly aromatic copolyamide drawn fiber was obtained by the same procedure as in Example 3, except that high-tension hot drawing was not performed (i.e., the para-type wholly aromatic copolyamide raw material fiber of Example 3). The physical properties of the obtained fiber are shown in Table 2.

Comparative Example 4

A para-type wholly aromatic copolyamide drawn fiber was obtained by the same procedure as in Example 1, except that the tension in the high-tension hot drawing step was 9800 cN (30% of the breaking tension of the para-type wholly aromatic copolyamide raw material fiber). The physical properties of the obtained fiber are shown in Table 2.

Comparative Example 5

A para-type wholly aromatic copolyamide drawn fiber was obtained by the same procedure as in Example 2, except that the high-tension hot drawing step was performed under the conditions in accordance with Example 3 of JP-A-7-166417 under a tension of 1860 cN (42% of the breaking tension of the para-type wholly aromatic copolyamide raw material fiber) and at a temperature of 250° C. The physical properties of the obtained fiber are shown in Table 2.

Comparative Example 6

A para-type wholly aromatic copolyamide fiber before high-tension hot drawing was obtained by the same procedure as in Example 1, except that in the high-tension hot drawing step, the tension was 2000 cN (6% of the breaking tension of the para-type wholly aromatic copolyamide raw material fiber), and the temperature was 500° C. The physical properties of the obtained fiber are shown in Table 2.

Comparative Example 7

A para-type wholly aromatic copolyamide fiber before high-tension hot drawing was obtained by the same procedure as in Example 1, except that a contact hot plate that allows for contact between the para-type wholly aromatic copolyamide raw material fiber and the hot plate was used for high-tension hot drawing, and that the tension in high-tension hot drawing was 4300 cN (13% of the breaking tension of the para-type wholly aromatic copolyamide raw material fiber). The physical properties of the obtained fiber are shown in Table 2.

TABLE 1

|  | Example 1 | Example 2 | Example 3 |
|---|---|---|---|
| Fineness of Raw Material Fiber (dtex) | 1670 | 220 | 110 |
| The Number of Filaments in Raw Material Fiber | 1000 | 133 | 48 |
| Breaking Tension of Raw Material Fiber (cN) | 32700 | 4400 | 2600 |
| Tension in High-Tension Hot Drawing (cN) | 3900 | 700 | 350 |
| (% relative to breaking tension) | (12%) | (16%) | (13%) |
| Temperature in High-Tension Hot Drawing (° C.) | 300 | 350 | 370 |
| Fineness of Drawn Fiber (dtex) | 1660 | 216 | 107 |
| Tensile Elastic Modulus of Drawn Fiber (cN/dtex) | 652 | 695 | 660 |
| Tensile Strength of Drawn Fiber (cN/dtex) | 25.8 | 25.0 | 25.9 |
| Breaking Elongation of Drawn Fiber (%) | 3.9 | 3.6 | 3.7 |
| 80° C. Dry-Heat Creep of Drawn Fiber ($10^{-4}$%) | 1.7 | 1.0 | 1.4 |
| 80° C. Dry-Heat Tensile Strength of Drawn Fiber (cN/dtex) | 23.4 | 23.5 | 23.9 |
| 120° C. Dry-Heat Tensile Strength of Drawn Fiber (cN/dtex) | 21.7 | 22.1 | 21.5 |
| 160° C. Dry-Heat Tensile Strength of Drawn Fiber (cN/dtex) | 19.7 | 20.1 | 19.6 |
| 200° C. Dry-Heat Tensile Strength of Drawn Fiber (cN/dtex) | 17.6 | 17.8 | 17.2 |
| Quality of Drawn Fiber | Good | Good | Good |

TABLE 2

|  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Fineness of Raw Material Fiber (dtex) | 1670 | 220 | 110 | 1670 | 220 | 1670 | 1670 |
| The Number of Filaments in Raw Material Fiber | 1000 | 133 | 48 | 1000 | 133 | 1000 | 1000 |
| Breaking Tension of Raw Material Fiber (cN) | 32700 | 4400 | 2600 | 32700 | 4400 | 32700 | 32700 |
| Tension in High-Tension Hot Drawing (cN) | — | — | — | 9800 | 1860 | 2000 | 4300 |
| (% relative to breaking tension) |  |  |  | (30%) | (42%) | (6%) | (13%) |
| Temperature in High-Tension Hot Drawing (° C.) | — | — | — | 300 | 250 | 500 | 300 |
| Fineness of Drawn Fiber (dtex) | 1670 | 220 | 110 | 1655 | 214 | 1610 | 1662 |
| Tensile Elastic Modulus of Drawn Fiber (cN/dtex) | 562 | 580 | 595 | 605 | 613 | 585 | 575 |
| Tensile Strength of Drawn Fiber (cN/dtex) | 25.2 | 24.7 | 25.2 | 24.1 | 24.0 | 21.3 | 21.0 |
| Breaking Elongation of Drawn Fiber (%) | 4.3 | 4.0 | 4.1 | 3.8 | 3.5 | 3.1 | 3.7 |
| 80° C. Dry-Heat Creep of Drawn Fiber ($10^{-4}$%) | 2.9 | 2.5 | 2.2 | — | — | — | — |
| 80° C. Dry-Heat Tensile Strength of Drawn Fiber (cN/dtex) | 21.8 | 21.9 | 22.7 | — | — | — | — |
| 120° C. Dry-Heat Tensile Strength of Drawn Fiber (cN/dtex) | 18.9 | 20.1 | 20.5 | — | — | — | — |
| 160° C. Dry-Heat Tensile Strength of Drawn Fiber (cN/dtex) | 17.5 | 17.9 | 18.2 | — | — | — | — |
| 200° C. Dry-Heat Tensile Strength of Drawn Fiber (cN/dtex) | 15.6 | 15.8 | 16.9 | — | — | — | — |
| Quality of Drawn Fiber | Good | Good | Good | Poor | Poor | Good | Poor |

INDUSTRIAL APPLICABILITY

The para-type wholly aromatic copolyamide drawn fiber of the invention serves as a fiber having an excellent tensile elastic modulus together with the inherent heat resistance of para-type wholly aromatic copolyamide fibers. At the same time, the breaking of fiber-forming single yarns is suppressed, and thus the fiber also has high tensile strength. Further, it serves as a fiber in which the deterioration of creep characteristics at high temperatures is suppressed, and also loss of tensile strength at high temperatures is suppressed. Accordingly, the para-type wholly aromatic copolyamide drawn fiber of the invention is useful for various industrial material applications. In particular, the fiber is particularly useful for reinforcing material applications for rubber, resin, and the like, rope applications, woven fabric applications, etc., for use at high temperatures.

The invention claimed is:

1. A para-type wholly aromatic copolyamide drawn fiber having: a tensile elastic modulus of 630 cN/dtex or more; and a dry creep of $2.0 \times 10\text{-}4\%$ or less after the lapse of 10 hours at 80° C.;
wherein the para-type wholly aromatic copolyamide drawn fiber is produce from a para-type wholly aromatic copolyamide obtained by reacting(i) an aromatic dicarboxylic acid dichloride component selected from the group consisting of terephthalic acid dichloride, 2-chloroterphthalic acid dichloride, 3-methylterephthalic acid dichloride, 4,4'-biphenyldicarboxylic acid dichloride, and 2,6-naphthalenedicarboxylic acid dichloride with (ii) an aromatic diamine component selected from the group consisting of paraphenylene diamine,3,4'-diaminodiphenyl ether, parabiphenylene diamine,5-amino-2-(4-aminophenylene)benzimidazole, and 1,4-dichloroparaphenylene diamine.

2. The para-type wholly aromatic copolyamide drawn fiber according to claim 1, having a dry-heat tensile strength at temperature T (° C.) that satisfies equation (1):
[Equation 1]

$$\text{dry-heat tensile strength} \geq 27.0 - 0.05 \times T \quad (1).$$

3. The para-type wholly aromatic copolyamide drawn fiber according to claim 1, having a tensile strength of 25.0 cN/dtex or more.

4. The wholly aromatic polyamide drawn fiber according to claim 1, wherein the wholly aromatic polyamide drawn fiber is a copolyparaphenylene/3,4'-oxydiphenylene terephthalamide drawn fiber.

5. A method for producing a para-type wholly aromatic copolyamide drawn fiber,
the method being a method for producing the para-type wholly aromatic copolyamide drawn fiber of claim 1 and comprising a high-tension hot drawing step of subjecting a para-type wholly aromatic copolyamide raw material fiber to hot drawing,
the para-type wholly aromatic copolyamide raw material fiber being obtained by wet spinning or half-dry half-wet spinning from a para-type wholly aromatic copolyamide solution,
the hot drawing being performed under a tension of 1% or more and less than 20% of the breaking tension of the para-type wholly aromatic copolyamide raw material fiber and at a temperature of 50° C. or more and 450° C. or less in such a manner that the para-type wholly aromatic copolyamide raw material fiber is not rubbed against metal of a device.

6. The method for producing a para-type wholly aromatic copolyamide drawn fiber according to claim 5, wherein the number of single yarns in the para-type wholly aromatic copolyamide drawn fiber is 5 to 2000 filaments.

7. The method for producing a para-type wholly aromatic copolyamide drawn fiber according to claim 5, wherein the para-type wholly aromatic copolyamide drawn fiber has a single-yarn fineness of 0.8 to 6.0 dtex.

8. The method for producing a para-type wholly aromatic copolyamide drawn fiber according to claim 5, wherein the para-type wholly aromatic copolyamide drawn fiber is a copolyparaphenylene/3,4'-oxydiphenylene terephthalamide fiber.

9. The para-type wholly aromatic copolyamide drawn fiber according to claim 2, having a tensile strength of 25.0 cN/dtex or more.

10. The method for producing a para-type wholly aromatic copolyamide drawn fiber according to claim 6, wherein the para-type wholly aromatic copolyamide drawn fiber has a single-yarn fineness of 0.8 to 6.0 dtex.

* * * * *